United States Patent
Lee

(10) Patent No.: US 10,160,844 B2
(45) Date of Patent: Dec. 25, 2018

(54) POLYOLEFIN-BASED CABLE COMPOUND FORMULATION FOR IMPROVED FOAMABILITY AND ENHANCED PROCESSABILITY

(71) Applicant: Dow Global Technologies LLC, Midland, MI (US)

(72) Inventor: Day-Chyuan Lee, Doylestown, PA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/649,810

(22) PCT Filed: Dec. 2, 2013

(86) PCT No.: PCT/US2013/072621
§ 371 (c)(1),
(2) Date: Jun. 4, 2015

(87) PCT Pub. No.: WO2014/099335
PCT Pub. Date: Jun. 26, 2014

(65) Prior Publication Data
US 2015/0307679 A1 Oct. 29, 2015

Related U.S. Application Data

(60) Provisional application No. 61/740,715, filed on Dec. 21, 2012.

(51) Int. Cl.
| C08J 9/00 | (2006.01) |
| C08J 9/10 | (2006.01) |
| C08J 9/06 | (2006.01) |
| C08J 9/14 | (2006.01) |
| C08L 23/06 | (2006.01) |
| H01B 3/44 | (2006.01) |

(52) U.S. Cl.
CPC .............. *C08J 9/103* (2013.01); *C08J 9/0023* (2013.01); *C08J 9/0028* (2013.01); *C08J 9/0061* (2013.01); *C08J 9/0066* (2013.01); *C08J 9/06* (2013.01); *C08J 9/14* (2013.01); *C08L 23/06* (2013.01); *H01B 3/441* (2013.01); *C08J 2203/04* (2013.01); *C08J 2207/06* (2013.01); *C08J 2323/06* (2013.01); *C08J 2423/06* (2013.01); *C08J 2423/08* (2013.01); *C08J 2423/26* (2013.01); *C08J 2471/02* (2013.01); *C08J 2491/06* (2013.01); *C08L 2203/14* (2013.01)

(58) Field of Classification Search
CPC .................................................. C08J 2323/06
See application file for complete search history.

(56) References Cited

U.S. PATENT DOCUMENTS

| 4,440,671 A | 4/1984 | Turbett |
| 5,246,783 A | 9/1993 | Spenadel et al. |
| 5,346,926 A | 9/1994 | Sakamoto et al. |
| 5,725,650 A | 3/1998 | Flenniken et al. |
| 5,747,563 A | 5/1998 | Flenniken et al. |
| 6,048,909 A | 4/2000 | Chaudhary et al. |
| 6,124,395 A | 9/2000 | Flenniken et al. |
| 6,448,300 B1 * | 9/2002 | Maletzko .................... C08J 9/18 521/56 |
| 6,496,629 B2 | 12/2002 | Ma et al. |
| 6,714,707 B2 | 3/2004 | Rossi et al. |
| 6,767,931 B2 | 7/2004 | Martinez et al. |
| 7,045,556 B2 | 5/2006 | Handa et al. |
| 7,226,955 B2 | 6/2007 | Subramonian et al. |
| 8,513,317 B2 | 8/2013 | Fukuzawa et al. |
| 8,901,182 B2 | 12/2014 | Fukuzawa et al. |
| 9,018,269 B2 | 4/2015 | Fukuzawa et al. |
| 9,216,525 B2 | 12/2015 | Yoshida et al. |
| 2006/0045439 A1 | 3/2006 | Brown et al. |
| 2009/0068429 A1 * | 3/2009 | Kmiec .................... C08L 23/04 428/218 |
| 2009/0304966 A1 | 12/2009 | Mehta et al. |
| 2010/0267850 A1 | 10/2010 | Yoshida et al. |
| 2010/0319957 A1 | 12/2010 | Abe et al. |
| 2012/0123067 A1 | 5/2012 | Mehta et al. |
| 2012/0283344 A1 * | 11/2012 | Nakayama ............. C08J 9/0023 521/56 |
| 2013/0197112 A1 | 8/2013 | Fukuzawa et al. |
| 2013/0230713 A1 | 9/2013 | Yoshida et al. |
| 2013/0231409 A1 | 9/2013 | Fukuzawa et al. |
| 2013/0338246 A1 * | 12/2013 | Yoshida ................ C08K 13/02 521/93 |

FOREIGN PATENT DOCUMENTS

| EP | 0090427 B1 | 8/1986 | |
| EP | 735545 B1 | 6/1999 | |
| EP | 1008620 A2 | 6/2000 | |
| JP | 2000-230068 A | 8/2000 | |
| JP | WO 2009075208 A1 * | 6/2009 | ............ C08J 9/0061 |
| JP | WO 2011086937 A1 * | 7/2011 | ............ C08J 9/0023 |
| WO | 2007/071274 A1 | 6/2007 | |

OTHER PUBLICATIONS

Machine translation of JP 2000225638 by Katsube et al. Aug. 2000.*
Scifinder abstract of JP 2000225638. JP 2000225638 published Aug. 2000.*
Machine translation of JP 07-048744 by Jinno et al. Feb. 1995.*
Machine translation of CN 102250399. Jun. 2011. Inventors: Liu, P; Lu, J.*
"Masterbatch" in Polymer Technology Dictionary. Ed. A. Whelan. 1994.*
Daniel Klemner et al., Handbook of Polymeric Foams and Foam Technology, 1991, p. 191, 195, 208.
G. Sun et al., Polymer Materials Science and Engineering, vol. 22, No. 2, Mar. 2006, pp. 173-176.

* cited by examiner

*Primary Examiner* — Randy P Gulakowski
*Assistant Examiner* — Christina H Wales
(74) *Attorney, Agent, or Firm* — Husch Blackwell LLP

(57) ABSTRACT

A composition comprising a composition of an ethylene-based thermoplastic polymer comprising high density polyethylene (HDPE) blended with a modifier component, an optional blowing agent, optionally with carbon black and/or one or more additives, to make foamed articles.

13 Claims, No Drawings

POLYOLEFIN-BASED CABLE COMPOUND FORMULATION FOR IMPROVED FOAMABILITY AND ENHANCED PROCESSABILITY

FIELD OF THE INVENTION

In one aspect, this invention relates to compositions composed of an extrudable blend of an ethylene-based thermoplastic polymer comprising high density polyethylene (HDPE) blended with a modifier component and an optional blowing (or foaming) agent, while in another aspect, the invention relates to the use of these compositions to make foamed articles. In another aspect, the invention relates to methods of producing foamed articles.

BACKGROUND OF THE INVENTION

Foamable compositions comprising ethylene and foaming/blowing agents have been used in wire and cable applications to make insulation and jacketing. However, foamability of polyethylene (PE) has been problematic.

Attempts have been made to improve the foamability of polyethylene by optimizing PE chain architecture (e.g., chain length, branching, etc.) in connection with the choice of foaming/blowing agents. To date, the most effective means to improve the foamability of polyethylene has been through the use of high melt strength low density polyethylene (LDPE).

High density polyethylene (HDPE) is a cost effective material and has the advantage of providing desired stiffness and rigidity to support the conductor of a wire or cable. However, HDPE is more difficult to foam compared to LDPE or LLDPE, especially when used in conjunction with a chemical foaming/blowing agent due to its semi-crystalline nature.

From an industry standpoint, it would be desirable to provide a material based on HDPE with improved foamability and high processability that can be used in fabricating extruded or molded cable components having reduced (low) weight and a balance of overall performance attributes.

SUMMARY OF THE INVENTION

In one embodiment, the invention is a foamable composition comprising, as a blend:

A. an ethylene-based thermoplastic polymer comprising high density polyethylene (HDPE);

B. a modifier component selected from the group consisting of polyethylene glycol (PEG) having a Mw of from 1,000 to 100,000, polypropylene glycol (PPG) having a Mw of from 1,000 to 100,000, diethylene glycol (DEG), paraffin wax, polar polyethylene copolymer, polyethylene/silane copolymer, triethanolamine (TEA), and combinations thereof; and C. optionally, a blowing agent; and D. optionally, a carbon black;

wherein the density of a foamed material prepared from the composition with a blowing agent is at least 1% less than the density of a foamed material prepared from a composition of the same formulation and blowing agent but without the inclusion of the modifier component.

In embodiments, the composition comprises 20 to 99.9 wt % of the ethylene-based thermoplastic polymer and 0.1 to 2 wt % of the modifier component, optionally with greater than zero (>0) to 2 wt % of the blowing agent, with the weight percentages (wt %) based upon the total weight of the composition. In embodiments, the composition comprises greater than zero (>0) to 3 wt % of carbon black. In embodiments, the carbon black is coated with the modifier component.

In embodiments, the composition comprises a chemical and/or physical blowing agent. In embodiments, the composition comprises a chemical blowing agent selected from the group consisting of azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine, and sodium bicarbonate. In embodiments, the composition comprises a physical blowing agent selected from the group consisting of carbon dioxide, nitrogen, a $C_2$ to $C_9$ hydrocarbon, a halogenated hydrocarbon and combinations thereof.

In embodiments, the composition has a viscosity of at least 1% to up to 15% lower than the same composition but made without the modifier component.

In embodiments, the modifier component is a polyethylene glycol (PEG) having a Mw of from 1,000 to 100,000.

In embodiments, the ethylene-based thermoplastic polymer comprises a bimodal HDPE. In embodiments, the ethylene-based thermoplastic polymer comprises a mixture of a bimodal HDPE with a unimodal polyethylene (PE), e.g., unimodal HDPE, a unimodal medium-density polyethylene (MDPE), a unimodal linear low-density polyethylene (LLDPE) and/or a unimodal low-density polyethylene (LDPE).

In other embodiments, the ethylene-based thermoplastic polymer comprises a unimodal HDPE, or a mixture of a unimodal HDPE with at least one polyethylene (PE) selected from the group consisting of a second unimodal HDPE, a unimodal MDPE, a unimodal LLDPE and/or a unimodal LDPE.

In embodiments, the composition consists essentially of a blend of the ethylene-based thermoplastic polymer and the modifier component, optionally the chemical foaming/blowing agent, optionally carbon black, and optionally one or more additives.

In another aspect, the invention provides a polymeric foam article made from the composition of the invention. In embodiments, the polymeric foam article comprises a cable jacket on a cable.

In yet another aspect, the invention provides a process of preparing a polymeric foam material, the process comprising extruding the composition of the invention and allowing the composition to expand into polymeric foam article, wherein the composition comprises a blowing agent prior to the extrusion, or the composition is combined with a blowing agent during the extrusion. In an embodiment, the process comprises extruding the composition of the invention onto a cable and foaming to form a cable jacket, which, in embodiments, provides a reduced excess fiber length (EFL).

DETAILED DESCRIPTION OF THE PREFERRED EMBODIMENT

Definitions

Unless stated to the contrary, implicit from the context, or customary in the art, all parts and percents are based on weight. For purposes of United States patent practice, the contents of any referenced patent, patent application or publication are incorporated by reference in their entirety (or its equivalent US version is so incorporated by reference) especially with respect to the disclosure of synthetic techniques, product and processing designs, polymers, catalysts, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, weight percentages, etc., is from 100 to 1,000, then the intent is that all individual values, such as 100, 101, 102, etc., and sub ranges, such as 100 to 144, 155 to 170, 197 to 200, etc., are expressly enumerated. For ranges containing values which are less than one or containing fractional numbers greater than one (e.g., 0.9, 1.1, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, the component amounts of the composition and various process parameters.

"Wire" and like terms mean a single strand of conductive metal, e.g., copper or aluminum, or a single strand of optical fiber.

"Cable", "communication cable," "power cable" and like terms mean at least one wire or optical fiber within a sheath, e.g., an insulation covering or a protective outer jacket. Typically, a cable is two or more wires or optical fibers bound together, typically in a common insulation covering and/or protective jacket. The individual wires or fibers inside the sheath may be bare, covered or insulated. Combination cables may contain both electrical wires and optical fibers. Electrical insulation applications are generally divided into low voltage insulation which are those less than 1 kV (one thousand volts), medium voltage insulation which ranges from 1 kV k to 30 kV, high voltage insulation which ranges from 30 kV to 150 kV, and extra high voltage insulation which is for applications above 150 kV (as defined by the IEC, the International Electrotechnical Commission). Typical cable designs are illustrated in U.S. Pat. Nos. 5,246,783, 6,496,629, 6,714,707, and US 2006/0045439.

"Composition" and like terms mean a mixture or blend of two or more components.

"Interpolymer" and like terms mean a polymer prepared by the polymerization of at least two different types of monomers. The generic term interpolymer thus includes copolymers (employed to refer to polymers prepared from two different types of monomers), and polymers prepared from more than two different types of monomers, e.g., terpolymers, tetrapolymers, etc.

"Comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

Unless expressly specified otherwise, polymer density and foamed polymer density are determined in accordance with ASTM D-792.

Unless expressly specified otherwise, the term "melt index—$I_2$" means the melt index, as determined in accordance with ASTM D1238 under a load of 2.16 kilograms (kg) and at a temperature of 190° C. The term "melt index—$I_{10}$" means the melt index, as determined in accordance with ASTM D1238 under a load of 10 kilograms (kg) and at a temperature of 190° C. The term "melt index—$I_{21}$" means the melt index, as determined in accordance with ASTM D1238 under a load of 21.6 kilograms (kg) and at a temperature of 190° C.

Overview

This invention is directed to foamable or foamed materials for fabricating foamed articles, including jacketing and insulation for wire and cable, including optical cables, composed of high density polyethylene (HDPE) and a modifier component, optionally with carbon black and optional additives, combined with a foaming (or blowing) agent, the components present in amounts effective to provide enhanced foamability of the composition. The composition further provides a lowered viscosity for enhanced processability and extrusion.

The present composition can be used for producing foams and foamed articles that are flexible and resilient. The composition can be used in many applications such as fabrics, shoe soles, shoe stiffeners, and artificial leather, tires for bicycles, wheel chairs, and stroller wheels, and in wire and cable insulation and jacketing formed by general extrusion or by calendered sheets or films with and without fillers.

High Density Polyethylene (HDPE)

The polymer blend composition includes an ethylene-based thermoplastic polymer composed of a high density polyethylene (HDPE) polymer. As used herein, the terms "high density polyethylene" polymer and "HDPE" polymer refer to a homopolymer or copolymer of ethylene having a density of equal or greater than 0.941 g/cm$^3$. The terms "medium density polyethylene" polymer and "MDPE" polymer refer to a copolymer of ethylene having a density from 0.926 to 0.940 g/cm$^3$. The terms "linear low density polyethylene" polymer and "LLDPE" polymer refer to a copolymer of ethylene having a density from 0.915 to 0.925 g/cm$^3$. The terms "low density polyethylene" polymer and "LDPE" polymer refer to a copolymer of ethylene having a density from 0.915 to 0.925 g/cm$^3$.

The ethylene-based thermoplastic polymer typically has a density of from 0.940 to 0.980, more typically from 0.941 to 0.980, more typically from 0.945 to 0.975, and more typically from 0.950 to 0.970, g/cm$^3$ as measured in accordance with ASTM D-792. In some embodiments, the ethylene-based thermoplastic polymer is a copolymer of ethylene having a density of from 0.940 to 0.970 g/cm$^3$.

In general, the ethylene-based thermoplastic polymer has a melt index (MI, $I_2$) of from 0.01 to 45, more typically from 0.1 to 10, and more typically from 0.15 to 5, and more typically from 0.5 to 2.5, g/10 minutes, as measured in accordance with ASTM D-1238, Condition 190° C./2.16 kg.

The ethylene-based thermoplastic polymer typically has a melt flow rate (MFR, $I_{10}/I_2$) of less than or equal to 30, more typically less than 25, and typically from 7 to 25, more typically from 10 to 22.

In embodiments, the ethylene-based thermoplastic polymer has a weight average molecular weight (Mw) (measured by GPC) of from 81,000 to 160,000, more typically from 90,000 to 120,000, and a number average molecular weight (Mn) (measured by GPC) of from 4,400 to 54,000, more typically from 5,000 to 32,000. In embodiments, the Mw/Mn ratio or molecular weight distribution (MWD) ranges from 3 to 18, more typically from 5 to 16.

The ethylene-based thermoplastic polymer comprises at least 50, preferably at least 60 and more preferably at least 80, mole percent (mol %) of units derived from ethylene monomer units. The other units of the ethylenic interpolymer are typically derived from one or more α-olefins. The α-olefin is preferably a $C_{3-20}$ linear, branched or cyclic α-olefin. Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins also can contain a cyclic structure such as cyclohexane or cyclopentane, resulting in an α-olefin such as 3-cyclohexyl-1-propene (allyl cyclohexane) and vinyl cyclohexane. Although not α-olefins in the classical sense of the term, for purposes of this invention certain cyclic olefins, such as norbornene and related olefins, particularly 5-ethylidene-2-norbornene, are α-olefins and can be used in place of some or all of the α-olefins described above. Illustrative ethylenic interpolymers include copolymers of ethylene/propylene, ethylene/butene, ethylene/1-hexene, ethylene/1-octene, and the like. Illustrative ethylenic terpolymers include ethylene/propylene/1-octene, ethylene/propylene-/butene, ethylene/butene/1-octene, ethylene/propylene/diene monomer (EPDM) and ethylene/butene/styrene.

The ethylene-based thermoplastic polymers used in the practice of this invention are non-functionalized polymers, i.e., they do not contain functional groups, such as hydroxyl, amine, amide, etc. As such polymers like ethylene vinyl acetate, ethylene methyl or ethyl acrylate and the like, are not ethylene-based thermoplastic polymers within the context of this invention.

The HDPE polymers and MDPE, LLDPE and LDPE polymers, used in the invention are well known in the literature and can be prepared by known techniques.

In general, the amount of the ethylene thermoplastic polymer present in the composition is from 20 to 99.9 wt %, more typically from 40, more typically from 60, more typically from 80, more typically from 90, to 99.9, wt %, based on the total weight of the composition. All individual values and subranges from 20 to 99.9 wt % are included and disclosed herein, for example from 94 to 99.9 wt %.

Unimodal HDPE

In embodiments, the ethylene-based thermoplastic polymer is a unimodal high density polyethylene (HDPE) polymer.

The terms "unimodal HDPE," "unimodal MDPE," "unimodal LLDPE" and "unimodal LDPE" as used herein refer to a polyethylene (PE) polymer having a molecular weight distribution (MWD) (measured by gel permeation chromatography (GPC)) that does not substantially exhibit multiple component polymers, that is, no humps, shoulders or tails exist or are substantially discernible in the GPC curve, and the degree of separation (DOS) is zero or substantially close to zero.

In embodiments, the ethylene-based thermoplastic polymer is a mixture of a unimodal HDPE with one or more component unimodal PE polymers, whereby the MWD in a GPC curve does not substantially exhibit multiple component polymers, that is, no humps, shoulders or tails exist or are substantially discernible in the GPC curve, and the degree of separation (DOS) is zero or substantially close to zero. In embodiments, the ethylene-based thermoplastic polymer is a mixture of a unimodal HDPE with one or more unimodal polyethylenes (PEs) selected from a second unimodal HDPE, a unimodal MDPE, a unimodal LLDPE and/or a unimodal LDPE.

Unimodal PE polymers are produced under one set of polymerization conditions, and can be produced by a conventional single stage polymerization (single reactor) process, such as a solution, slurry or gas-phase process, using a suitable catalyst such as a Ziegler-Natta or Phillips type catalyst or a single site metallocene catalyst, as described, for example, in U.S. Pat. No. 5,324,800. Unimodal PE resins are well known and commercially available in various grades. Nonlimiting examples of unimodal PEs include those sold under the tradenames DGDK-3364NT (a HDPE) and DHDA-6548BK (a MDPE), available from The Dow Chemical Company.

Multimodal HDPE

In embodiments, the ethylene-based thermoplastic polymer is a multimodal (i.e., bimodal) HDPE. The term "multimodal," as used herein, means that the MWD in a GPC curve exhibits two or more component polymers, wherein one component polymer may even exist as a hump, shoulder or tail relative to the MWD of the component polymer. A multimodal HDPE polymer is prepared from one, two or more different catalysts and/or under two or more different polymerization conditions. A multimodal HDPE polymer comprises at least a lower molecular weight component (LMW) and a higher molecular weight (HMW) component. Each component is prepared with a different catalyst and/or under different polymerization conditions. The prefix "multi" relates to the number of different polymer components present in the polymer. The multimodality (or bimodality) of the HDPE polymer can be determined according to known methods. Typically, the multimodal HDPE is a bimodal HDPE.

In embodiments, the HMW component has a density of from 0.90, more typically from 0.915, to 0.935, more typically to 0.94, g/cm³, and a melt index ($I_{21}$) of 30 or less, more typically 10 or less, g/10 min. The HMW HDPE polymer component of a bimodal HDPE polymer is typically present in an amount of 10 to 90, more typically 30 to 70, wt %.

In embodiments, the LMW component has a density of from 0.940, more typically from 0.950, to 0.975, more typically to 0.980, g/cm³, and a melt index ($I_2$) of 50 or more, more typically 80 or more, g/10 min. The LMW HDPE polymer component is typically present in an amount of 10 to 90, more typically 30 to 70, wt %.

Multimodal HDPE can be produced using conventional polymerization processes, such as a solution, slurry or gas-phase process, using a suitable catalyst such as a Ziegler-Natta or Phillips type catalyst or a single site metallocene catalyst. A nonlimiting example of a multimodal HDPE is set forth in EP 2016128(B1), U.S. Pat. No. 7,714,072 and US 2009/0068429. A nonlimiting example of suitable multimodal HDPE is sold under the tradename DGDK 6862NT, available from The Dow Chemical Company, Midland, Mich.

In embodiments, the ethylene-based thermoplastic polymer can be a mixture of a bimodal HDPE with one or more other bimodal PEs and/or one or more unimodal PEs, e.g., HDPE, MDPE, LLDPE and/or LDPE.

Modifier Component

The ethylene-based thermoplastic polymer is blended with a modifier component of a select group of compounds as described herein. The modifier component functions in combination with the ethylene-based thermoplastic polymer to modify the polymer composition to improve the foamability.

In embodiments, the ethylene-based thermoplastic polymer is combined with one or more of the following modifier components: polyethylene glycol (PEG) and/or polypropylene glycol (PPG) having a Mw of from 1,000 to 100,000, more typically from 5,000 to 50,000, diethylene glycol (DEG), paraffin wax, one or more polar polyethylene copolymers, one or more polyethylene/silane copolymer, and triethanolamine (TEA).

Nonlimiting examples of polyethylene glycol (PEG) include those sold under the tradenames Polyglykol® available from Clariant Corporation, Carbowax™ available from The Dow Chemical Co., and GoLYTELY, GlycoLax, Fortrans, TriLyte, Colyte, Halflytely, Macrogel, MiraLAX and MoviPrep.

A nonlimiting example of a polypropylene glycol (PPG) is sold under the tradename Polyglycol P-4000E, available from The Dow Chemical Co.

A nonlimiting example of a diethylene glycol (DEG) is sold under the tradename Diethylene Glycol (high purity), available from The Dow Chemical Co.

A polyethylene with polar groups (i.e., "polar polyethylene copolymers") can be produced by copolymerization of ethylene monomers with polar comonomers or by grafting a polar monomer onto the polyethylene according to conventional methods. Examples of polar comonomers include $C_1$ to $C_6$ alkyl (meth)acrylates, (meth)acrylic acids and vinyl acetate. In embodiments, the polar polyethylene copolymer is an ethylene/(meth)acrylate, ethylene/acetate, ethylene/hydroxyethylmethacrylate (EHEMA), ethylene/methylacrylate (EMA), and/or ethylene/ethyleacrylate (EEA) copolymer.

The modifier component as a polyethylene comprising silane functional groups (i.e., "polyethylene/silane copolymer") can be produced by copolymerizing of ethylene monomers with a silane compound or by grafting a silane compound onto an ethylene polymer backbone according to conventional methods, as described, for example, in U.S. Pat. Nos. 3,646,155 or 6,048,935. Examples of silane compounds include vinyl silanes, e.g., a vinyltrialkoxysilane copolymer such as vinyltrimethoxysilane (VTMOS) and vinyltriethyoxysilane (VTEOS).

The amount of the modifier component in the composition is typically from 0.1 to 2, more typically from 0.3, more typically from 0.4, more typically from 0.5, to 2, wt %, based on the total weight of the composition. All individual values and subranges from 0.1 to 2 wt % are included and disclosed herein, for example from 0.5 to 2 wt %.

Blowing Agent

In embodiments, the composition further comprises a blowing or foaming agent. In the present disclosure, the terms "blowing agent" and "foaming agent" are synonymous and can be used interchangeably to mean a substance which alone or in combination with other substances is capable of rendering the composition foamable to produce a cellular structure.

Useful blowing agents include decomposable chemical blowing agents, which decompose at elevated temperatures under the condition of the foaming process to form gases or vapors to blow the polymer composition into a foam form. The chemical blowing agent preferably takes a solid form so it may be easily dry-blended with the polymer material. Non-limiting examples of suitable chemical blowing agents include azodicarbonamide, azodiisobutyronitrile, benzenesulfo hydrazide, 4,4 oxybenzene sulfonyl semi carbazide, p-toluene sulfonyl semi carbazide, barium azodicarboxylate, N,N' dimethyl-N,N' dinitrosoterephthalamide, trihydrazino triazine, sodium bicarbonate, and combinations thereof.

In other embodiments, a physical blowing agent can be used in processes for making the foam. Physical blowing agents include gases and liquids that volatilize under the conditions of the foaming process to form gases or vapors to blow the polymer composition into a foam form. Non-limiting examples of suitable physical blowing agents include inorganic blowing agents including carbon dioxide and nitrogen; and organic blowing agents such as saturated or unsaturated and cyclic hydrocarbons having from two to nine carbons ($C_2$ to $C_9$) including isobutene, isopentane and cyclopentane, and halogenated hydrocarbons such as chlorofluorocarbons including trichloromonofluoromethane (CFC-11), dichlorofluoromethane (HCFC-22) and 1-chloro-1,1 difluoroethane (HCFC-142b), and fluorocarbons including 1,1,1,2-tetrafluoro-ethane (HFC-134a), and combinations thereof.

In embodiments, where included, the amount of the blowing agent in the composition is at greater than zero (>0), typically from 0.1, more typically from 0.1 to 2, wt %, based on the total weight of the composition. All individual values and subranges from >0 to 2 wt % are included and disclosed herein, for example from 0.2 to 2 wt %.

Carbon Black

The composition can optionally contain a non-conductive carbon black commonly used in cable jacketing.

The carbon black component can be compounded with the ethylene-based thermoplastic polymer and modifier component, either neat or as part of a pre-mixed masterbatch.

In embodiments, the modifier compound is included in the composition as a coating on a carbon black material. In embodiments, aggregates of the carbon black are coated with the modifier component. The modifier component can be coated onto the carbon black using conventional methods, as described, for example, in U.S. Pat. Nos. 5,725,650, 5,747,563 and 6,124,395.

In embodiments, wherein included, the amount of a carbon black in the composition is at greater than zero (>0), typically from 1, more typically from 2, to 3, wt %, based on the total weight of the composition. All individual values and subranges from >0 to 3 wt % are included and disclosed herein, for example from 2 to 3 wt %.

In embodiments, the composition can optionally include a conductive carbon black at a high level for semiconductive applications.

Non-limiting examples of conventional carbon blacks include the grades described by ASTM N550, N472, N351, N110 and N660, Ketjen blacks, furnace blacks and acetylene blacks. Other non-limiting examples of suitable carbon blacks include those sold under the tradenames BLACK PEARLS®, CSX®, ELFTEX®, MOGUL®, MONARCH®, REGAL® and VULCAN®, available from Cabot.

Additives

The composition can optionally contain one or more additives, which are generally added in conventional amounts, either neat or as part of a masterbatch.

Additives include but not limited to flame retardants, processing aids, nucleating agents, foaming agents, cross-linking agents, fillers, pigments or colorants, coupling agents, antioxidants, ultraviolet stabilizers (including UV absorbers), tackifiers, scorch inhibitors, antistatic agents, slip agents, plasticizers, lubricants, viscosity control agents, anti-blocking agents, surfactants, extender oils, acid scavengers, metal deactivators, vulcanizing agents, and the like.

Nonlimiting examples of flame retardants include, but are not limited to, aluminum hydroxide and magnesium hydroxide.

Nonlimiting examples of processing aids include, but are not limited to, fatty amides such as stearamide, oleamide, erucamide, or N,N'-ethylene bis-stearamide; polyethylene wax; oxidized polyethylene wax; polymers of ethylene oxide; copolymers of ethylene oxide and propylene oxide; vegetable waxes; petroleum waxes; non-ionic surfactants; silicone fluids; polysiloxanes; and fluoroelastomers such as Viton® available from Dupon Performance Elastomers LLC, or Dynamar™ available from Dyneon LLC.

A nucleating agent can be added to control the size of the foam cells. Nonlimiting examples of nucleating agents include inorganic substances such as calcium carbonate, talc, clay, titanium oxide, silica, and the like. Other examples include but are not limited to Zonyl® polytetrafluoroethylene (PTFE) fluoroadditives from DuPont, Hyperform® HPN-20E (1,2-cyclohexanedicarboxylic acid calcium salt with zinc stearate) from Milliken Chemicals, Spartanburg, S.C., and nucleating agent master batches such as Hydrocerol® NUC 5532 from Clariant.

Nonlimiting examples of fillers include, but are not limited to, various flame retardants, clays, precipitated silica and silicates, fumed silica, metal sulfides and sulfates such as molybdenum disulfide and barium sulfate, metal borates such as barium borate and zinc borate, metal anhydrides such as aluminum anhydride, ground minerals, and elastomeric polymers such as EPDM and EPR. If present, fillers are generally added in conventional amounts, e.g., from 5 wt % or less to 50 or more wt % based on the weight of the composition.

Compounding/Preparation of Foams

The composition of the invention may be used to form extruded or expanded thermoplastic polymer foams, and molded articles formed by expansion.

The foamable polymer composition can be produced by any suitable method. For example, the composition can be prepared by blending together the ethylene-based thermoplastic polymer, modifier component(s), optionally carbon black and any additives, and optionally one or more blowing agents in a suitable mixing device. Such compounding of the components can be performed by blending, for example, using an internal batch mixer such as a Banbury or Bolling internal mixer. Alternatively, continuous single or twin screw mixers can be used, such as a Farrel continuous mixer, a Werner and Pfleiderer twin screw mixer, or a Buss kneading continuous extruder.

The modifier component, carbon black and/or the additives can be introduced into the ethylene-based thermoplastic polymer composition alone (neat) or as a pre-mixed masterbatch. Such masterbatches are commonly formed by dispersing the modifier, carbon black and/or additives into an inert plastic resin, e.g., polyethylene. Masterbatches are conveniently formed by melt compounding methods.

In embodiments, the ethylene-based thermoplastic polymer is compounded with the modifier component and optional additives, without carbon black. In other embodiments, the ethylene-based thermoplastic polymer, modifier component and carbon black (neat or as a pre-mixed master batch) are compounded, optionally with one or more additives. In other embodiments, the ethylene-based thermoplastic polymer is compounded with carbon black having a surface treatment of the modifier component, and optional additives, with optional additional amounts of the modifier component added either neat or as a premixed masterbatch.

In embodiments, the modifier component is introduced neat or in a pre-mixed masterbatch and/or as a coating on a carbon black material.

The foaming agent can be mixed with the composition prior to or simultaneously with the extrusion of the composition. In embodiments, a chemical blowing agent is incorporated into the polymer melt, which is then processed into a foam material. In other embodiments, a physical blowing agent is incorporated into the polymer melt during the foaming step. In embodiments in which the composition is foamed simultaneously with extrusion forming or other process step, a physical foaming agent is preferably used. The blowing agent is mixed with the melt polymer material at an elevated pressure sufficient to prevent substantial expansion of the melt polymer material and to generally disperse the blowing agent homogeneously therein. Optionally, a nucleating agent can be blended in the polymer melt.

Foam structures may be made by a conventional extrusion foaming process, as described, for example, in U.S. Pat. Nos. 6,048,909, 6,767,931, 7,045,556 and 7,226,955.

In one embodiment, the composition comprising a decomposable chemical blowing agent and optionally a cross-linking agent can be prepared and extruded through a die, optional cross-linking induced, and the extruded melt material then exposed to an elevated temperature to release the chemical blowing agent to effect foaming or expansion to form the foam structure. The foamable melt polymer material is heated or exposed to a temperature to prevent pre-mature decomposition of the chemical blowing agent (and/or cross-linking agent) and to prevent premature cross-linking. The foamable melt polymer material is extruded or conveyed through a die of desired shape to form a foamable structure.

The cellular insulation extrusion process requires critical temperature control to ensure uniform and consistent foaming to achieve precise control of foamed insulation expansion level and insulation wall thickness. The blowing agent is decomposed during the fabrication extrusion process as it passes through the extruder and crosshead. A supersaturated condition develops as the polymer melt containing the dissolved gases exit the extrusion coating die and the melt pressure drops to atmospheric pressure. This allows gas cell nucleation and cell growth. After exiting the die, the length of the air gap to the water trough allows for foam diameter expansion. Once the wire enters the water trough, the foam expansion and diameter growth is halted by the rapid solidification of the insulation surface. In embodiments, the foamable melt polymer material can be coated onto a substrate (e.g., a cable construction) at selected temperature following the above described process.

In another embodiment, a foam material can be prepared by melt blending together the ethylene-based thermoplastic polymer, modifier component, optional carbon black and optional additives, incorporating a physical blowing agent, and extruding the material through a die of a desired shape to a zone of reduced or lower pressure to form the foam structure. In embodiments, the foamable melt polymer material can be coated onto a substrate (e.g., a cable construction) at a selected temperature to optimize the cellular structure.

In embodiments, the density of the foamed material (e.g., a compression molded plaque) prepared in a foaming process from the composition with inclusion of a chemical foaming agent or by use of a physical blowing agent, is at least 1% less than the density of a foamed material (e.g., a compression molded plaque) made by the same foaming process and from a composition of the same formulation but without the inclusion of the chemical foaming agent or use of the physical blowing agent.

Articles of Manufacture

The compositions of the present invention may be used to prepare a variety of articles or their component parts or portions, including, but are not limited to, foamed sheets, fibers, molded goods and extruded parts.

Articles that can be prepared from the polymer compositions of this invention include wire and cable jacketing, weather stripping, belts, flooring materials, seals, gaskets, hoses, tubes, pipes, sheets, footwear components, computer parts, automotive parts, building materials, electrical supply housings, storage or packaging containers, acoustic devices, utility cart parts, toys and water craft parts, roofing membranes, among others. These articles can be manufactured using known equipment and techniques.

In one embodiment, the composition of this invention can be applied to a cable as a sheath or insulation layer in known amounts and by known methods (for example, with the equipment and methods described, for example, in U.S. Pat. Nos. 5,246,783, 6,714,707, 6,496,629 and US 2006/0045439. Typically, the composition is prepared in a reactor-extruder equipped with a cable-coating die and after the components of the composition are formulated, the composition is extruded over the cable as the cable is drawn through the die to form a foamed material layer.

The invention is described more fully through the following examples. Unless otherwise noted, all parts and percentages are by weight.

Specific Embodiments

EXAMPLE

Materials

The following materials were used in the examples.

DMDA-1250 NT is a Unipol gas phase bimodal HDPE with a density of 0.955 g/cm$^3$ and a melt index (MI, I$_2$) of 1.5 g/10 min. (190° C./2.16 kg), available as CONTINUUM™ DMDA-1250 NT 7 from The Dow Chemical Company.

DFDB-3580 NT is a Unipol gas phase unimodal MDPE with a density of 0.935 g/cm$^3$ and a melt index (MI, I$_2$) of 0.6 g/10 min (190° C./2.16 kg), available from The Dow Chemical Company.

DGDA-6944 is a Unipol gas phase unimodal HDPE with a density of 0.965 g/cm$^3$ and a melt index (MI, I$_2$) of 8.0 g/10 min (190° C./2.16 kg), available from The Dow Chemical Company.

GRSN-2420 NT is a Unipol gas phase unimodal HDPE with a density of 0.924 g/cm$^3$ and a melt index (MI, I$_2$) of 20 g/10 min (190° C./2.16 kg), available from The Dow Chemical Company.

The azodicarbonamide (AZO) used as the chemical blowing masterbatch, is commercially available under the tradenames Cellcom AC7000F from Rita-Chem, or Celogen AZ-130 from Galata Chemical.

Irganox 1010 is an antioxidant, available commercially from Ciby Specialty Chemicals Inc.

PEG 20,000 is a polyethylene glycol (PEG) with a molecular weight of 20,000, available commercially under the tradename Polyglykol® from Clariant Corporation, Charlotte, N.C.

DFNC-0037BK is a pelleted 45% carbon black masterbatch ("CBM") (particle size: 20 millimicrons (0.02 microns) average), available commercially from The Dow Chemical Company.

Blends of commercial unimodal and bimodal HDPE with carbon black, optionally with PEG-20000 as the modifier component and/or the azodicarbonamide chemical foaming agent, as shown in Table 1, were compounded, formed into foamed plaques and measured for density.

The composition blends from Table 1 were prepared by introducing the HDPE polymer(s), the carbon black master batch, optionally the PEG-20000 (for CS1, Ex. 1 and Ex. 2), and optionally the azodicarbonamide (AZO) blowing agent (for Ex. 1, CS3, Ex. 2 and CS4) into a Brabender mixing bowl @50 RPM (0.833 Hz) at 185° C. for 5 minutes. The mixed compound was compression molded to produce an 8"×8"×75 mils (20.32 cm×20.32 cm×75 mils) plaque using a Wabash electric press operated in the manual mode. The press was preheated to 179° C. (±5° C.), the material was pre-weighed and placed it in the center of a 75-mil stainless steel plaque between a mold assembly made of mold release-treated Mylar and aluminum sheets. The filled mold was then placed into the press at 500 psi (35.15 kg/cm$^2$) for 5 minutes. After 5 minutes, the pressure was increased to 2,500 psi (175.76 kg/cm$^2$) for 5 minutes. The plaque was then slowly cooled at a rate of −15° C. per minute and removed when the temperature reached room temperature. The reference and foamed density of the plaques was then measured at 20° C. according to ASTM D792-86 using isopropanol as the liquid medium.

TABLE 1

| | wt % | | | |
| --- | --- | --- | --- | --- |
| | Sample without foaming agent | | Sample with foaming agent | |
| | CS1 | CS2 (Control) | EX. 1 | CS3 |
| DMDA-1250 NT (bimodal HDPE) | 93.55 | 94.15 | 92.45 | 93.05 |
| DFNB-3580 NT (unimodal MDPE) | — | — | — | — |
| DGDA-6944 (unimodal HDPE) | — | — | — | — |
| GRSN-2420 NT (unimodal LLDPE) | — | — | 0.558 | 0.558 |
| Azodicarbonamide (AZO) (Chem. Blowing Agent) | — | — | 0.539 | 0.539 |
| Irganox 1010 | — | — | 0.003 | 0.003 |
| PEG 20,000 | 0.6 | — | 0.6 | — |
| DFNC-0037BK (Carbon black MB) | 5.85 | 5.85 | 5.85 | 5.85 |
| Total (wt %) | 100 | 100 | 100 | 100 |
| Regular and Foam Density (ASTM D1622) | 0.9673 | 0.9661 | 0.9087 | 0.9249 |
| % reduction of density compare to sample with same formulation without foaming agent | — | — | 6.06 | 4.26 |
| % reduction of density compare to sample with same formulation without PEG | −0.12 | — | 1.75 | — |
| % foaming improvement | — | — | 41.07 | — |
| Apparent Viscosity (Pa · s) over range from 520 to 1015 sec−1 | 196 @ 590 sec−1; 128 @ 1155 sec−1 | 214 @ 590 sec−1; 137 @ 1155 sec−1 | — | — |

TABLE 1-continued

| | | | | |
|---|---|---|---|---|
| Viscosity reduction (%) over same formulation without PEG | −8% @ 590 sec−1; −6% @ 1155 sec−1 | — | — | — |
| DMDA-1250 NT (bimodal HDPE) | — | — | — | — |
| DFNB-3580 NT (unimodal MDPE) | 70.16 | 70.61 | 69.34 | 69.79 |
| DGDA-6944 (unimodal HDPE) | 23.39 | 23.54 | 23.11 | 23.26 |
| GRSN-2420 NT (unimodal LLDPE) | — | — | 0.558 | 0.558 |
| Azodicarbonamide (AZO) (Chem. Blowing Agent) | — | — | 0.539 | 0.539 |
| Irganox 1010 | — | — | 0.003 | 0.003 |
| PEG 20,000 | 0.6 | — | 0.6 | — |
| DFNC-0037BK (Carbon black MB) | 5.85 | 5.85 | 5.85 | 5.85 |
| Total (wt %) | 100.00 | 100.00 | 100 | 100 |

| | wt % | | | |
|---|---|---|---|---|
| | Sample without foaming agent | | Sample with foaming agent | |
| | CS4 | CS5 | EX. 2 | CS6 |
| Regular and Foam Density (ASTM D1622) | 0.9551 | 0.9546 | 0.9176 | 0.9303 |
| % reduction of density compared to sample with same formulation without foaming agent | — | — | 3.92 | 2.54 |
| % reduction of density compared to sample with same formulation without PEG | −0.05 | — | 1.37 | — |
| % foaming improvement | | | 53.65 | — |
| Apparent Viscosity (Pa · s) over range from 520 to 1015 sec-1 | 274 @ 520 sec−1; 191 @ 1015 sec−1 | 251 @ 520 sec−1; 173 @ 1015 sec−1 | — | — |
| Viscosity reduction (%) over same formulation without PEG | −8% @ 520 sec−1; −9% @ 1015 sec−1 | — | — | — |

The foamability of the chemical blowing agent (AZO) is indicated by the density of the compression molded plaque. At the same level of the blowing agent, the compounds with lower plaque density had higher foamability and were easier to foam.

The results in Table 1 show that replacing a portion of the bimodal HDPE resin of the Control sample CS2 with 0.54 wt % AZO to produce sample CS3 resulted in a reduction of the plaque density by 4.3%. The results also show that replacing a portion of the bimodal HDPE resin in the Control sample CS2 with 0.54 wt % AZO and 0.6 wt % PEG to produce Example 1 resulted in the reduction of the plaque density by 6.1% compared to the Control (CS2). Thus, the presence of PEG (in Ex. 1) improved the foamability (i.e., ability to reduce plaque density) by 41% compared to the compound with the same formulation (CS3) without the PEG component.

A similar improvement was observed for the sample pairs with different polyethylene (PE) compositions. The density (0.9176) of Example 2 (unimodal HDPE+MDPE) containing 0.6 wt % PEG and 0.5 wt % blowing agent was 1.4% lower than the density (0.9303) of the same formulation (CS6) made without PEG. Thus, the presence of PEG (in Ex. 2) improved the foamability by 54% compared to the same formulation (CS6) without the PEG component.

The results also showed that in the absence of the chemical blowing agent, the presence of 0.6 wt% PEG did not significantly change the plaque density. This is illustrated for the bimodal HDPE resin by CS1 (d=0.9673) compared to CS2 (d=0.9661), which had 0.12% lower density, and for the unimodal HDPE (+MDPE) resin by CS4 (d=0.9551) compared to CS5 (d=0.9546), which had a 0.05 lower density.

The results show that the resin compositions of the invention made with both a chemical blowing agent and a modifier component (e.g., PEG) provide a significant reduction in density of a foamed material compared to a foamed material made from a resin of the same formulation but without the chemical blowing agent or modifier.

Viscosity Reduction

In addition to the lowered density of the HDPE material, the addition of the modifier component (e.g., PEG) lowered the viscosity of the HDPE composition compared to the same resin formulation made without the modifier component.

As shown in Table 1, the CS1 sample (bimodal HDPE with 0.6 wt % PEG) had a lower apparent viscosity ranging from 196 to 128 Pa·s over a shear rate ranging from 590 to 1115 sec-1, compared to the CS2 sample (same formulation without PEG), which had an apparent viscosity ranging from 214 to 137 Pa·s over the same shear rate range.

Similarly, the CS4 sample (unimodal HDPE+MDPE with 0.6 wt % PEG) had a lower apparent viscosity that ranged from 274 to 191 Pa·s over a shear rate ranging from 520 to 1015 sec-1, compared to the CS5 sample (same formulation without PEG), which had an apparent viscosity ranging from 251 to 173 Pa·s over the same shear rate range.

It is specifically intended that the present invention not be limited to the embodiments and illustrations contained herein, but include modified forms of those embodiments including portions of the embodiments and combinations of elements of different embodiments as come within the scope of the following claims.

I claim:

1. A foamable composition comprising, as a blend:
   A. an ethylene-based thermoplastic polymer comprising 80 to 99.9 wt % of a bimodal high density polyethylene (HDPE);
   B. a modifier component selected from the group consisting of polyethylene glycol (PEG) having a Mw of from 1,000 to 100,000, polypropylene glycol (PPG) having a Mw of from 1,000 to 100,000, diethylene glycol (DEG), polar polyethylene copolymer, triethanolamine (TEA), and combinations thereof; and
   C. >0 to 2 wt % a blowing agent; and
   D. optionally, carbon black;
   the weight percentage (wt %) based upon the total weight of the composition.

2. The composition of claim 1, comprising 0.1 to 2 wt % of the modifier component.

3. The composition of claim 1, comprising:
   A. 80 to <99.9 wt % of the ethylene-based thermoplastic polymer; and
   B. 0.1 to 2 wt % of the modifier component; and
   further comprising at least one of:
   C. >0 to 2 wt % of the blowing agent; and/or
   D. >0 to 3 wt % of the carbon black;

the weight percentages (wt %) based upon the total weight of the composition.

4. The composition of claim 1, comprising a chemical blowing agent selected from the group consisting of azodicarbonamide, azodiisobutyronitrile, benzenesulfo-hydrazide, 4,4-oxybenzene sulfonyl semi-carbazide, p-toluene sulfonyl semi-carbazide, barium azodicarboxylate, N,N'-dimethyl-N,N'-dinitrosoterephthalamide, trihydrazino triazine, and sodium bicarbonate.

5. The composition of claim 1, comprising a physical blowing agent selected from the group consisting of carbon dioxide, nitrogen, a $C_2$ to $C_9$ hydrocarbon, a halogenated hydrocarbon and combinations thereof.

6. The composition of claim 1, wherein the modifier component is a polyethylene glycol (PEG) having a Mw of from 1,000 to 100,000.

7. The composition of claim 1, consisting essentially of a blend of the HDPE and the modifier component, optionally a chemical blowing agent, optionally carbon black, and optionally one or more additives.

8. A polymeric foam article made from the composition of claim 1.

9. A process of preparing a polymeric foam material, the process comprising extruding the composition of claim 1 and allowing the composition to expand into polymeric foam article, wherein
a) the composition comprises the blowing agent prior to the extrusion; or
b) the blowing agent is incorporated into a melt blend of composition during the extrusion.

10. The composition of claim 1, wherein the modifier component is a polyethylene glycol (PEG) having a Mw of from 20,000 to 100,000.

11. The composition of claim 1, wherein the modifier component is a polyethylene glycol (PEG) having a Mw of from 20,000 to 50,000.

12. The composition of claim 1, wherein the ethylene-based thermoplastic polymer comprises a mixture of a) the bimodal high density polyethylene (HDPE) and b) an ethylene-based polymer selected from the group consisting of one or more other bimodal polyethylenes and one or more unimodal polyethylenes.

13. The composition of claim 12, wherein the ethylene based-polymer comprises a mixture of the bimodal high density polyethylene (HDPE) and one or more unimodal polyethylenes selected from the group consisting of high density polyethylene (HDPE), medium density polyethylene (HDPE), linear low density polyethylene (LLDPE) and low density polyethylene (LDPE).

* * * * *